(12) United States Patent
Kim et al.

(10) Patent No.: US 6,642,985 B2
(45) Date of Patent: *Nov. 4, 2003

(54) FRINGE FIELD MODE LCD SHIELDED FROM ELECTROSTATIC DISTURBANCES

(75) Inventors: Hyang Yul Kim, Kyoungki-do (KR); Seung Hee Lee, Kyoungki-do (KR); Seung Ho Hong, Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 20 days.

This patent is subject to a terminal disclaimer.

(21) Appl. No.: 09/870,973

(22) Filed: May 31, 2001

(65) Prior Publication Data

US 2001/0048501 A1 Dec. 6, 2001

(30) Foreign Application Priority Data

Jun. 1, 2000 (KR) .......................... 2000-30096

(51) Int. Cl.[7] .................. G02F 1/1343; G02F 1/1333; G02F 1/1337
(52) U.S. Cl. .................. 349/141; 349/110; 349/132; 349/40
(58) Field of Search ................ 349/106, 110, 349/141, 40, 132

(56) References Cited

U.S. PATENT DOCUMENTS

| | | | | |
|---|---|---|---|---|
| 5,953,092 A | * | 9/1999 | Sung et al. | 349/141 |
| 6,040,886 A | * | 3/2000 | Ota et al. | 349/111 |
| 6,064,451 A | * | 5/2000 | Oh et al. | 349/141 |
| 6,111,627 A | * | 8/2000 | Kim et al. | 349/141 |
| 6,285,431 B2 | * | 9/2001 | Lyu et al. | 349/129 |
| 2002/0097359 A1 | * | 7/2002 | Chuang | 349/123 |

* cited by examiner

Primary Examiner—Tarifur R. Chowdhury
(74) Attorney, Agent, or Firm—Ladas & Parry

(57) ABSTRACT

The present invention discloses a fringe field switching mode liquid crystal display. The disclosed comprises: a lower and an upper substrates disposed opposite to each other at a predetermined distance, having transparency; a counter electrode and a pixel electrode disposed on the inner surface of the lower substrate with a gate insulating layer interposed and made of transparent conductors, forming a fringe field when a electric field is applied; a black matrix and color filter formed on the inner surface of the upper substrate; an ITO layer disposed on the inner surface of the upper substrate which has the black matrix and the color filter therein; and a liquid crystal layer interposed between the lower and the upper substrates, including a plurality of liquid crystal molecules of negative dielectric anisotropy. In the FFS mode LCD of the present invention, the counter electrode has a plate shape and the pixel electrode has a slit shape. And the counter electrode has one or more grooves whose width is smaller than that of the slit of the pixel electrode, preferably 2 or 3 $\mu$m and the ITO layer includes a window region therein.

9 Claims, 7 Drawing Sheets

FRINGE FIELD MODE LCD SHIELDED FROM ELECTROSTATIC DISTURBANCES

BACKGROUND OF THE INVENTION

1. Field of the Invention

The present invention relates to a fringe field switching mode liquid crystal display, and more particularly a fringe field switching mode liquid crystal display realizing a high quality screen and reducing production cost at the same time.

2. Description of the Related Art

An In-Plane Switching (IPS) mode LCD has been proposed in order to improve a narrow viewing angle of TN mode LCD. This IPS mode LCD has an improved viewing angle by a structure that a counter electrode and a pixel electrode for driving liquid crystal are disposed on an array substrate and only a major axis is to be seen regardless of the viewing direction.

As described above, the IPS mode LCD has an improved viewing angle, however, it has a low aperture ratio and transmittance since the counter and pixel electrodes are formed of opaque metals. Therefore, a fringe field switching mode LCD (hereinafter referred as FFS mode LCD) has been pro posed in order to improve the aperture ratio and transmittance of IPS mode LCD. The FFS mode LCD is characterized by that liquid crystals are driven by a fringe field.

In the FFS mode LCD, a counter and a pixel electrodes are formed of transparent materials and the distance thereof is narrower than that of substrates. The width is sufficient to drive liquid crystals disposed on the upper part of electrodes.

Accordingly, the FFS mode LCD has an improved aperture ratio by forming the counter and the pixel electrodes with transparent materials and has an improved transmittance by transmitting light at the electrodes.

FIG. 1 is a cross-sectional view illustrating a conventional FFS mode LCD. As shown in FIG. 1, a lower substrate (1) is disposed opposite to an upper substrate (11) at a predetermined distance (d: hereinafter referred as cell gap). A liquid crystal layer (20) comprising a plurality of liquid crystal molecules (20a) is then interposed between the substrates (1, 11). The liquid crystal molecules (20a) have negative or positive dielectric anisotropy.

A counter electrode (2) and a pixel electrode (4) for driving the liquid crystal molecules (20a) are formed on the inner surface of the lower substrate (1) with a gate insulating layer (3) interposed between them. As described above, the counter electrode (2) and pixel electrode (4) are formed of transparent conductors and the distance thereof is narrower than cell gap (d). The counter electrode (2) has a plate shape and the pixel electrode (4) has a silt shape. Although it is not shown, a gate bus line and a data bus line are cross arranged on the inner surface of the lower substrate (1) to define a unit pixel and a thin film transistor is disposed at the intersection of the lines.

A black matrix (12) is then formed on the inner surface of the upper substrate (11) and subsequently, a color filter (13) of red, green and blue (hereinafter referred as R, G, B) is formed between the black matrices (12), that is, on a pixel region.

An over coating layer (14) is formed on the black matrix (12) and color filter (13) to protect the color filter (13) and obtain planarization. The layer (14) comprises a high molecular substance such as acryl and epoxy.

Alignment layers (5, 15) for low pretilt below 3° C. are coated on the resultant lower and upper substrate (1, 11) respectively and the alignment layers (5, 15) are rubbed so that rubbing axes thereof may be in anti-parallel with each other.

Although it is not shown, lower and upper polarizing plates are adhered to the outer surfaces of the lower and upper substrates (1, 11). The lower polarizing plate has a polarizing axis in parallel with a rubbing axis of the lower alignment layer (5) and the upper polarizing plate has a polarizing axis perpendicular to that of the lower polarizing plate.

In the conventional FFS-LCD having the above structure, when the counter electrode (2) and pixel electrode (4) have different voltage, the distance between the electrodes becomes narrower than cell gap (d), thereby generating a fringe field. The fringe field has an effect on the liquid crystal molecules on the upper part of the electrodes (2, 4) due to the narrow distance between the electrodes.

Therefore, FFS mode LCD has improved aperture ratio and transmittance when compared to IPS mode LCD since almost all liquid crystal molecules in the pixel are driven.

FIG. 2 is a graph simulating transmittance according to the voltage change in a conventional FFS mode LCD. The graph shows the results when the liquid crystal molecules has a dielectric anisotropy $(\Delta)\epsilon$ of $-4$, refractive anisotropy $(\Delta n)$ of 0.077 and phase retardation $(\Delta n \cdot d)$ of 0.3 $\mu m$.

Referring to the graph, when the response speed is 100.00 ms, the transmittance is approximately 45.6%.

However, the FFS mode LCD has a disadvantage of high production cost due to an over coating layer (14) formed on the upper substrate. And, the FFS mode LCD has a difficulty in realizing a high quality screen since a counter electrode and a pixel electrode are all disposed on a lower substrate, therefore it is difficult to eliminating electrostatic and afterimage.

As shown in FIG. 1, a electrostatic protection layer (16) comprising ITO of a thickness below 500 Å may be formed on the outer surface of upper substrate (11), however, the production cost is increased by formation process of the layer (16).

SUMMARY OF THE INVENTION

Therefore, an object of the present invention is to provide a FFS mode LCD of high quality screen by eliminating electrostatic and afterimage.

And, another object of the invention is to reduce the production cost of the FFS mode LCD.

In order to achieve the above objects, the FFS mode LCD according to the present invention comprises: a lower and an upper substrates disposed opposite to each other at a predetermined distance, having transparency; a counter electrode and a pixel electrode disposed on the inner surface of the lower substrate with a gate insulating layer interposed and made of transparent conductors, forming a fringe field when a electric field is applied; a black matrix and a color filter formed on the inner surface of the upper substrate; an ITO layer disposed on the inner surface of the upper substrate including the black matrix and color filter; and a liquid crystal layer interposed between the lower and upper substrates, including a plurality of liquid crystal molecules of negative dielectric anisotropy.

The FFS mode LCD of the present invention further comprises: a first horizontal alignment layer disposed on the top of the lower substrate and having a predetermined rubbing axis; a second horizontal alignment layer disposed on the ITO layer of the upper substrate and having a rubbing axis in anti-parallel with that of the first horizontal alignment layer; a lower polarizing plate disposed on the outer surface of the lower substrate and having a polarizing axis in parallel with the rubbing axis of the first horizontal alignment layer; and an upper polarizing plate disposed on the outer surface of the upper substrate and having a polarizing axis perpendicular to that of the lower polarizing plate.

In the FFS mode LCD according to the present invention, the counter electrode has a plate shape and the pixel electrode has a slit shape. And, the counter electrode has one or more grooves having a width smaller than that of the slit of the pixel electrode, preferably, 2 or 3 μm and the ITO layer includes a window region.

BRIEF DESCRIPTION OF THE DRAWINGS

The above objects, and other features and advantages of the present invention will become more apparent after a reading of the following detailed description when taken in conjunction with the referenced drawings.

DETAILED DESCRIPTIOIN OF THE INVENTION

Figure 1:
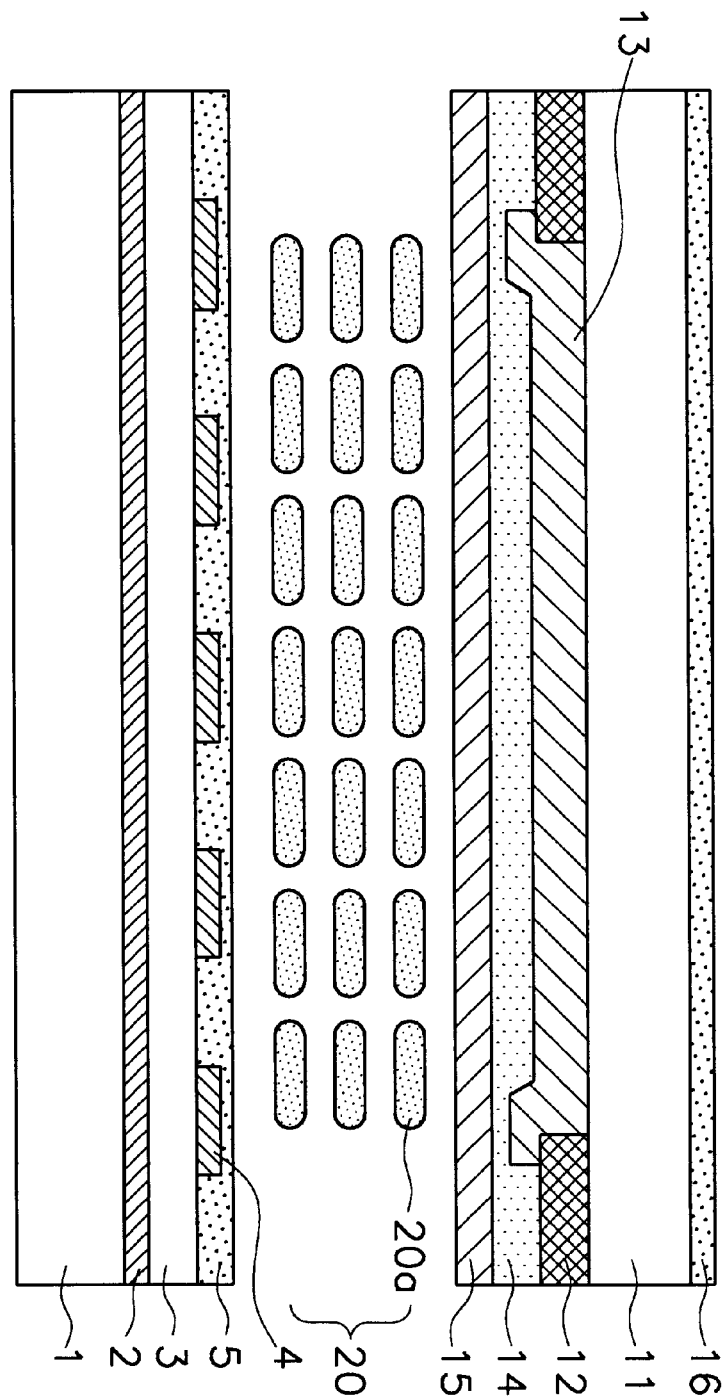
FIG. 1 is a cross-sectional view illustrating a conventional FFS mode LCD.
Figure 2:
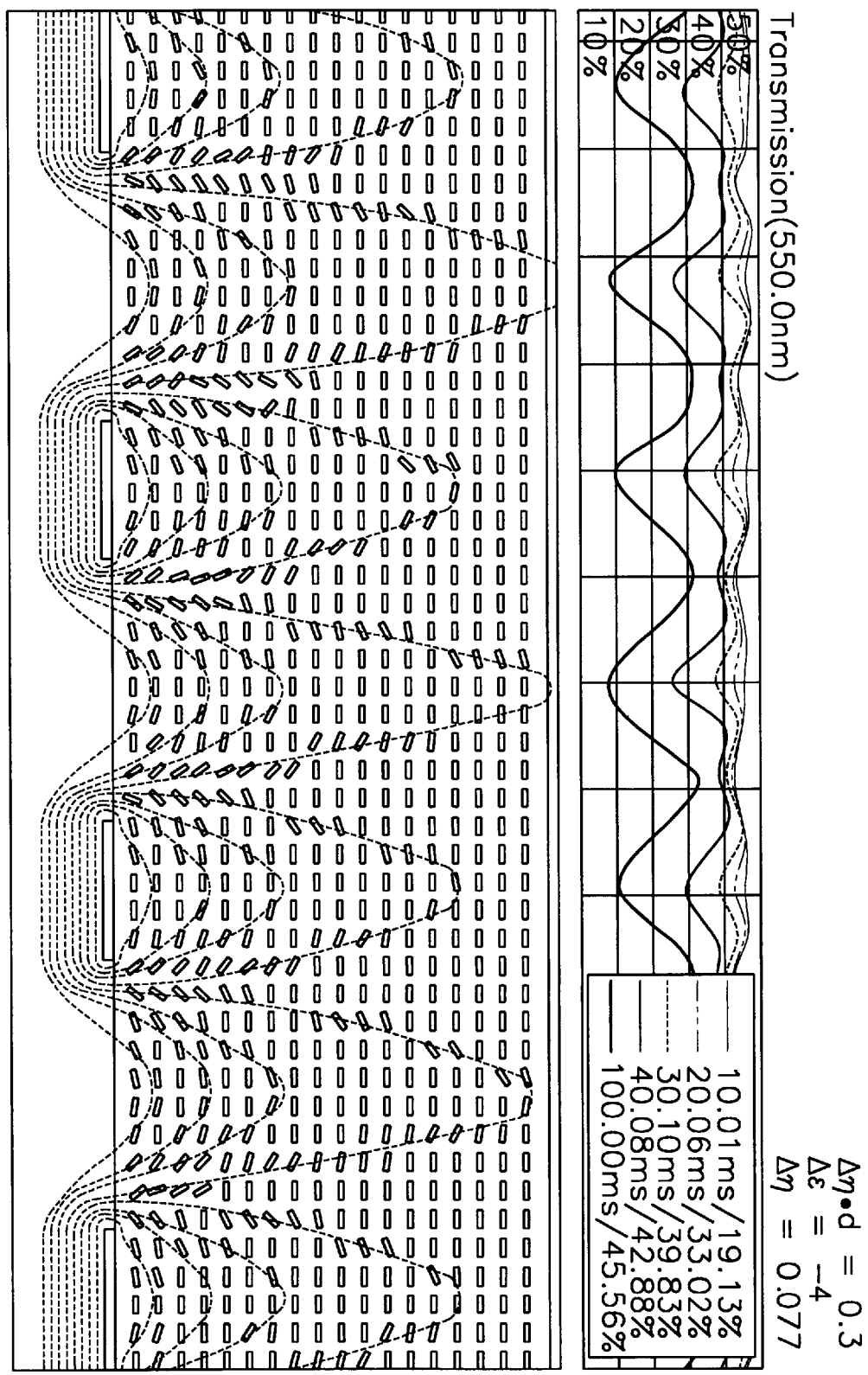
FIG. 2 is a graph simulating transmittance according to the voltage change in a conventional FFS mode LCD.
Figure 3:
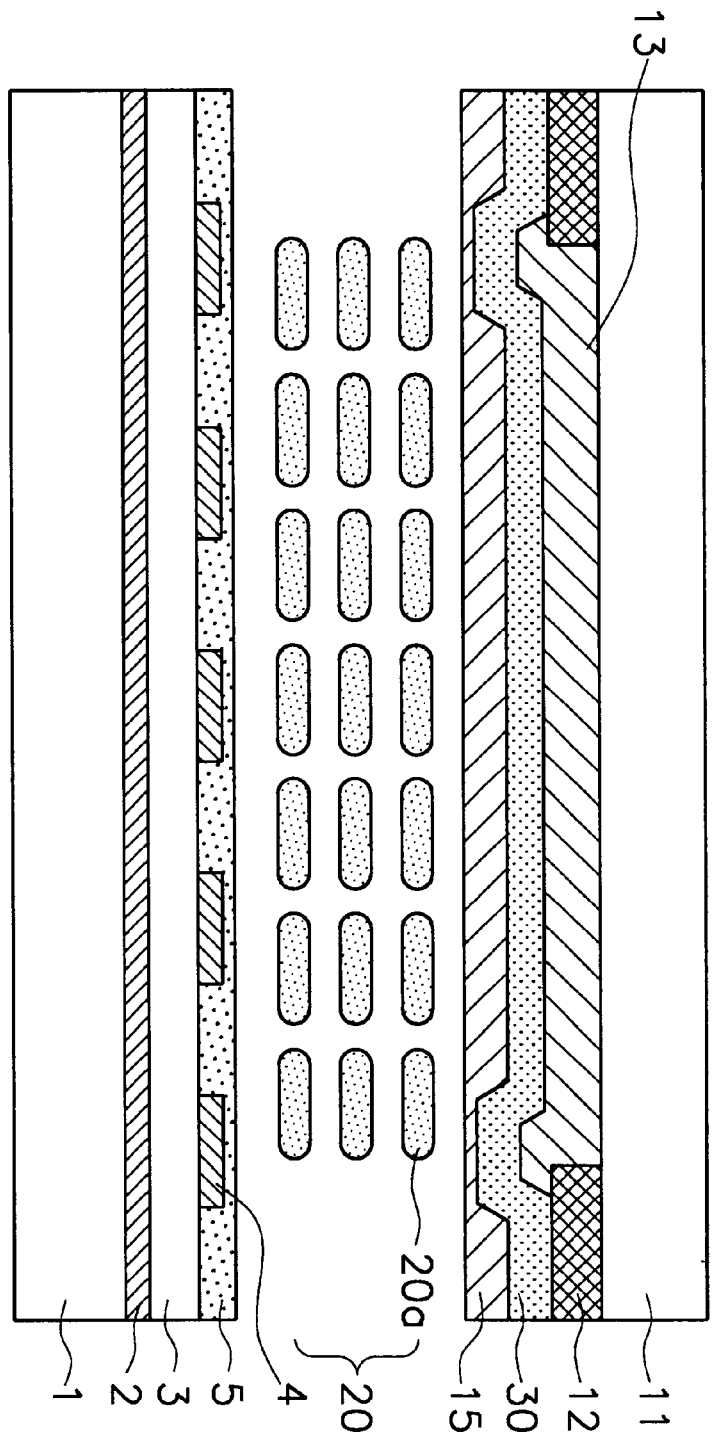
FIG. 3 is a cross-sectional view illustrating a FFS mode LCD according to a preferred embodiment of the present invention.

FIG. 3 is a cross-sectional view of FFS mode LCD according to a preferred embodiment of the present invention. The same parts as FIG. 1 are referred as the same drawing codes.

A lower substrate (1) and an upper substrate (11) are first disposed opposite to each other at a predetermined distance (d). The lower and upper substrates (1,11) are transparent insulating substrates, such as glass substrates. A liquid crystal layer (20) comprising a plurality of liquid crystal molecules (20a) of negative dielectric anisotropy is then interposed between the substrates (1,11).

A plurality of gate bus lines and data bus lines (not illustrated) are cross-arranged on the inner surface of the lower substrate (1). A TFT (not illustrated) is disposed at the intersection of the lines. A counter electrode (2) and a pixel electrode (4) comprising transparent conductors, such as ITO, are disposed in the pixel region defined by the gate bus line and the data bus line with a gate insulating layer (3) interposed between them.

The counter electrode (2) has a plate shape and the pixel electrode has a slit shape comprising a plurality of branches. When the counter electrode (2) is formed in a slit shape, the branches of the counter electrode (2) and those of the pixel electrode (4) are cross-arranged.

A black matrix (12), comprising resin or chrome, is disposed on the inner surface of the upper substrate (1).

Subsequently, a R, G and B color filter (13) is disposed in a pixel area defined by the black matrices (12). An ITO layer (30) is then disposed on the black matrix (12) and color filter (13) in order to prevent electrostatic and eliminate afterimage. The ITO layer (30) has a planarized surface to be used as an over coating layer at the same time. And the ITO layer (30) may include a window region therein, which is preferably disposed on the upper portion of the gate bus line or the data bus line in order to prevent generation of capacitance between the ITO layer (30) and the lines.

A lower and an upper alignment layers (5, 15) are respectively disposed on the inner surfaces of the lower and upper substrates (1, 11) as horizontal alignment layers for low pretilt below 3° C. The lower and upper alignment layers (5, 15) are rubbed so that the rubbing axes thereof may be in anti-parallel with each other, that is, to have a predetermined angle.

Although it is not shown, a lower and an upper polarizing plates are adhered to the outer surfaces of the lower and upper substrates (1, 11) respectively. The lower polarizing plate has a polarizing axis in parallel with a rubbing axis of the lower alignment layer (5) and the upper polarizing plate has a polarizing axis perpendicular to that of the lower polarizing plate.

In the FFS mode LCD according to the present invention, the liquid crystal layer (20) comprises liquid crystal molecules (20a) of negative dielectric anisotropy. This is because the molecules of negative dielectric anisotropy have an improved transmittance over those of positive dielectric anisotropy for the following reasons.

When the positive liquid crystal molecules are employed, the major axes thereof are arranged in the direction of electric field formed between the ITO layer (30) and the pixel electrode (4), therefore it becomes difficult to control the liquid crystals by a fringe field or an in-plane field. As a result, when the positive liquid crystal molecules are employed in the FFS mod LCD, it is difficult to obtain desired transmittance. On the other hand, when the negative molecules are employed, it is possible to obtain desired transmittance by controlling phase retardation (Δn·d). The phase retardation (Δn·d) of negative liquid crystal molecules (20a) is approximately 0.20 to 0.50 μm.

And, when the negative liquid crystal molecules are employed, the lower and upper alignment layers (5, 15) are rubbed below +45 or −45, preferably +12 or −12, to the gate bus line or data bus line.

According to the FFS mod LCD of the present invention, the ITO layer prevents the generation of electrostatic and at the same time, performs as an over coating layer. Therefore, the process for the over coating layer formation is not necessary, thereby reducing the production cost.

And, the impurity ions resulting from response to electric field are dispersively adsorbed by the electrode on the lower substrate (1) and by the ITO layer (30) since the ITO layer (30) is disposed on the inner surface of upper substrate (11), thereby reducing the time for eliminating the afterimages.

As a result, a FFS mode LCD of the present invention has advantages of obtaining a high quality screen by preventing electrostatic and reducing the time for eliminating afterimages. Moreover, a process for over coating layer formation is omitted, thereby reducing the total production cost.

Figure 4:
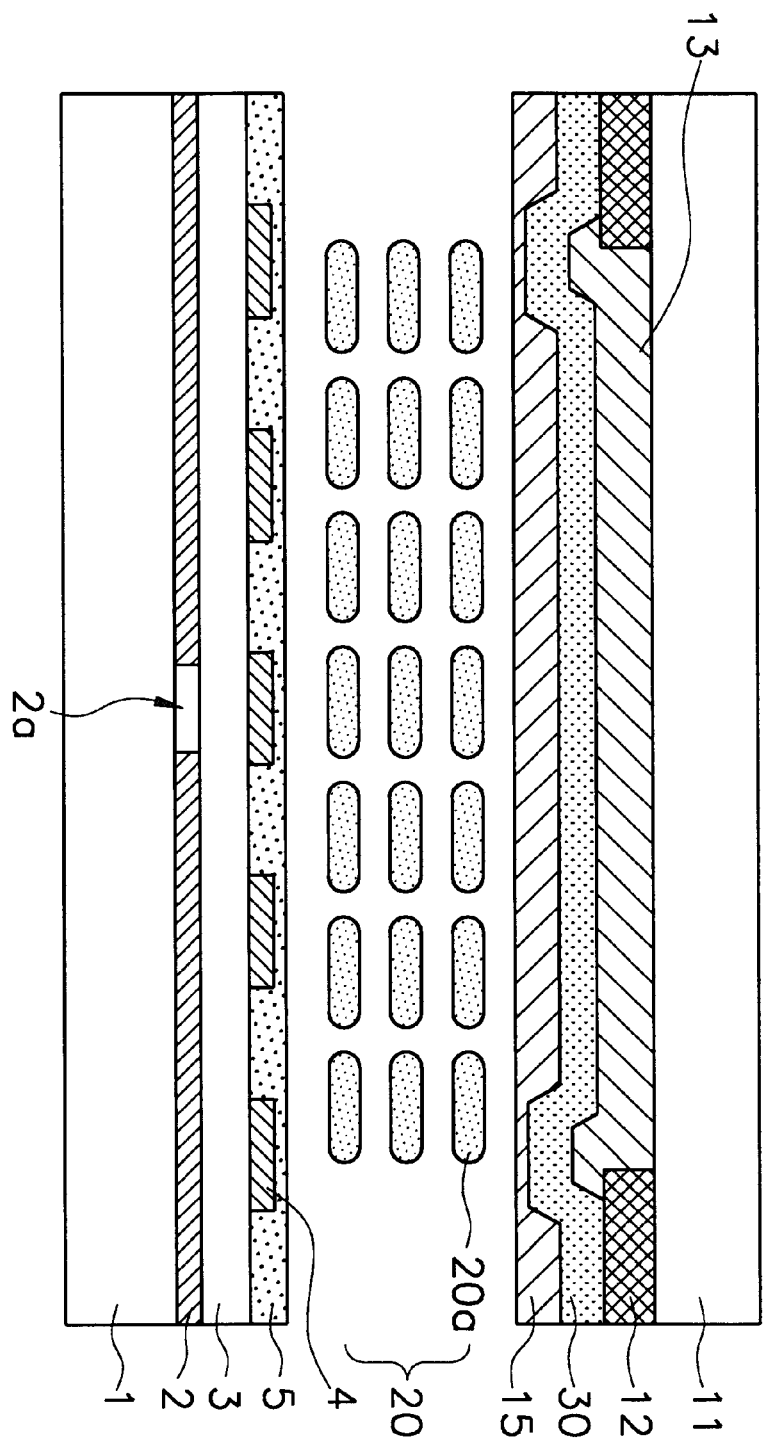
FIG. 4 is a cross-sectional view illustrating a FFS mode LCD according to another embodiment of the present invention.
Figure 5:
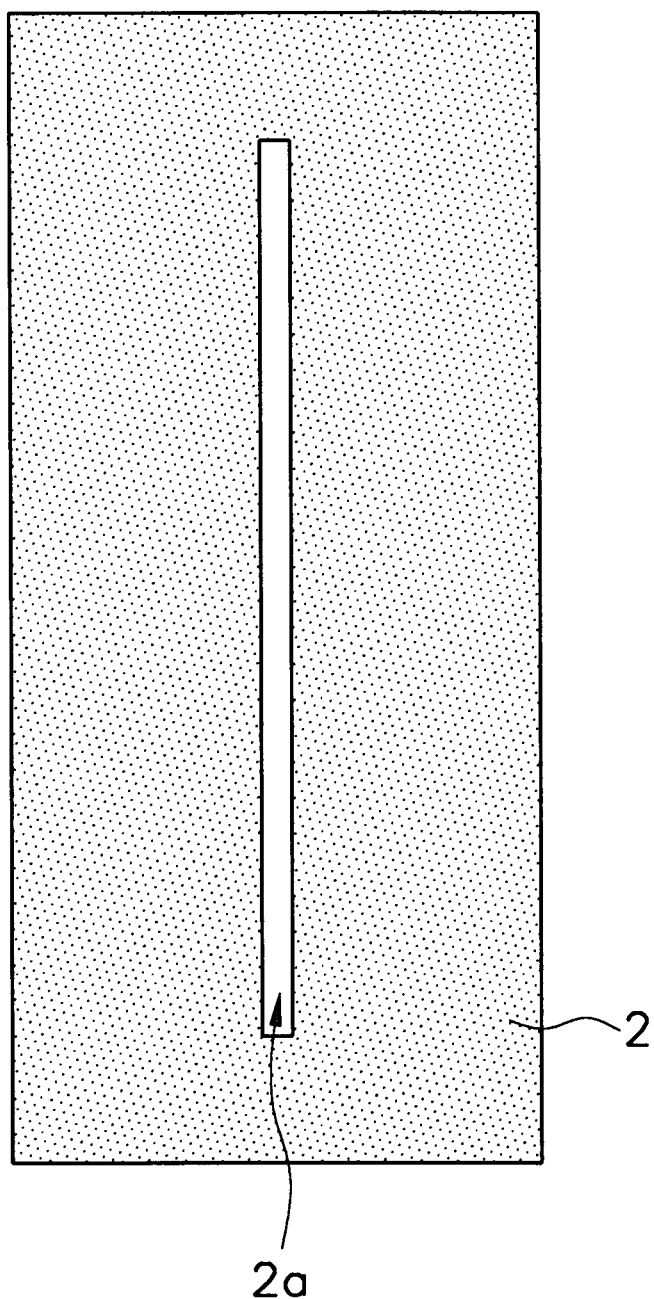
FIG. 5 is a plane view of a counter electrode in FIG. 4.

FIG. 4 is a cross-sectional view of a FFS mode LCD according to another embodiment of the present invention and FIG. 5 is a plane view of the counter electrode in FIG. 4.

As shown in FIGS. 4 and 5, the FFS mode LCD of the preferred embodiment has a counter electrode having a different shape from that of other embodiments. The counter electrode (2) has a plate shape as a whole and one or more grooves (2a) are disposed therein. The grooves (2a) are disposed preferably under the branches of the pixel electrode (4) and the width is smaller than that of the branches, preferably 2 or 3 μm.

The grooves (2a) are disposed in order to solve the shortage of capacity due to capacitance between the ITO layer (30) and the pixel electrode (4).

Figure 6:
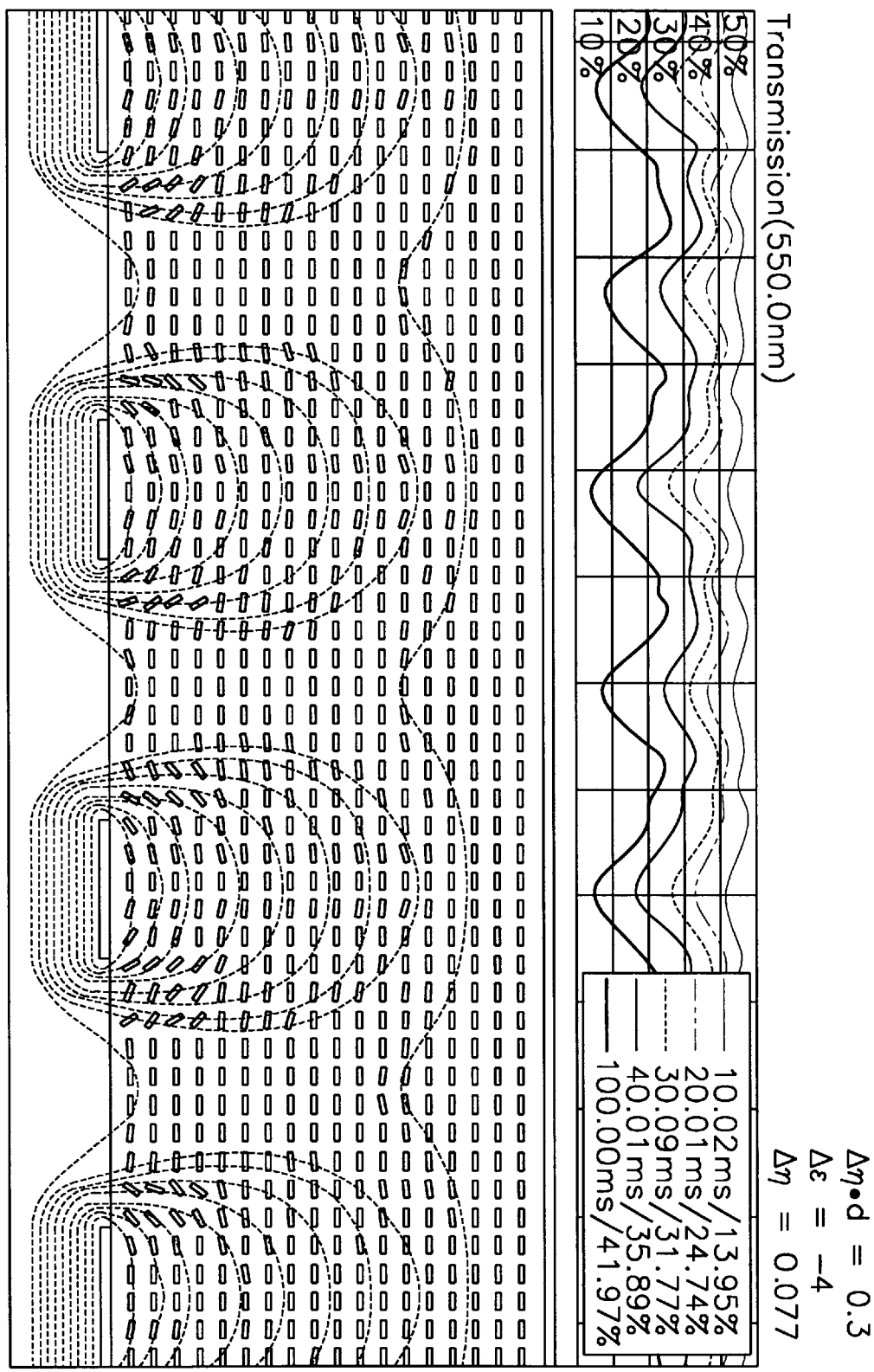
FIGS. 6 and 7 are graphs simulating transmittance according to the voltage change in a FFS mode LCD by the embodiments of the present invention.

FIG. 6 is a graph simulating transmittance according to the change of voltage in a FFS mode LCD of the present invention. The graph shows the result obtained when the liquid crystal molecules have dielectric anisotropy (Δ)ε of −4, refractive anisotropy (Δn) of 0.077 and phase retardation (Δn·d) of 0.3 μm.

As shown in the graph, in spite of the ITO layer formed on the upper substrate, when the response speed is 100.00 ms, transmittance is approximately 42% similar to that of a conventional FFS mode LCD.

Figure 7:
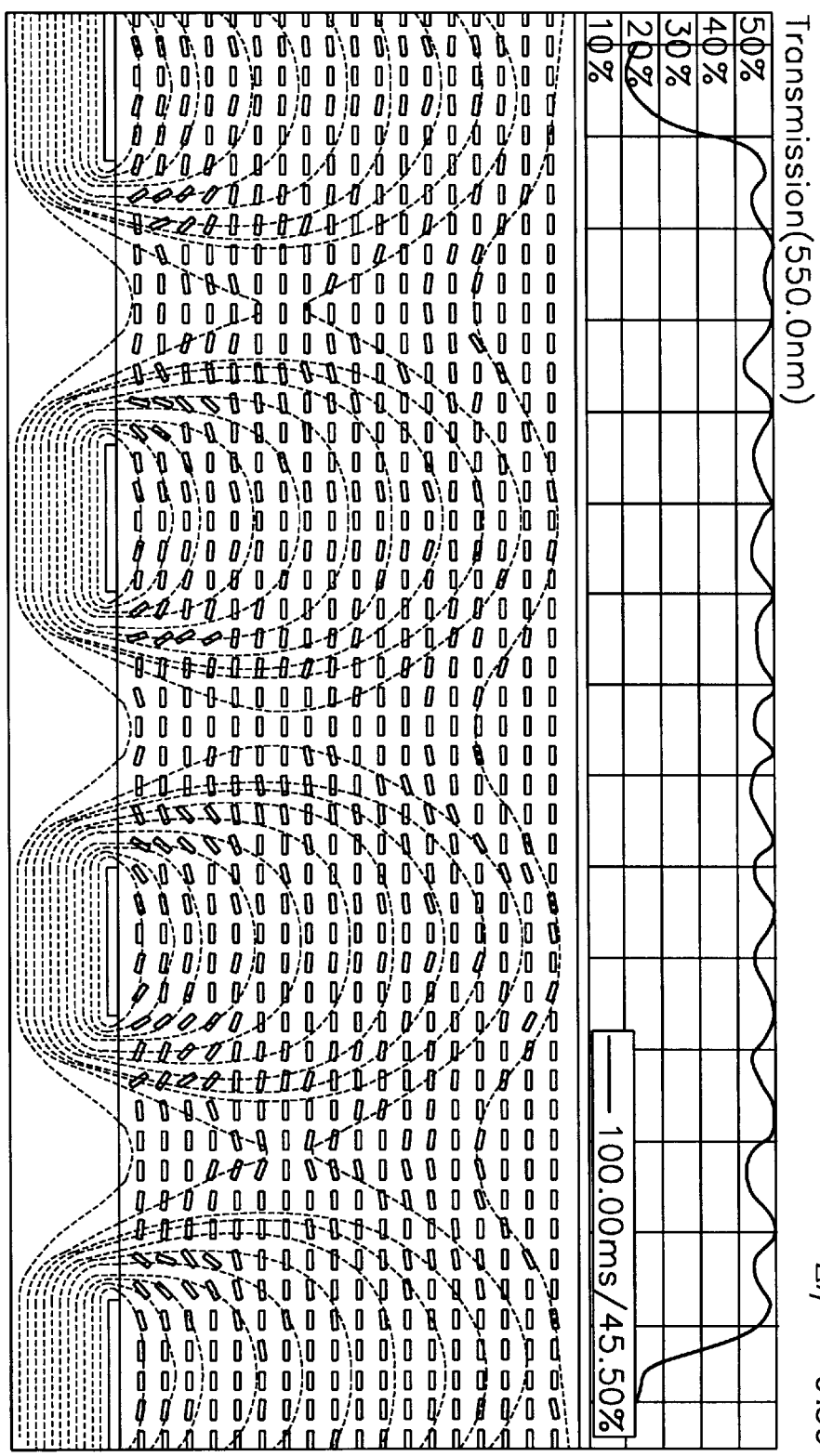

FIG. 7 is a graph simulating transmittance according to the change of voltage in a FFS mode LCD of another embodiment of the present invention. The graph shows the result obtained when the liquid crystal molecules have dielectric anisotropy (Δ)ε of −4, refractive anisotropy (Δn) of 0.09 and phase retardation (Δn·d) of 0.33 μm.

As shown in the graph, when the response speed is 100.00 ms, transmittance is approximately 45% similar to that of a conventional FFS mode LCD.

Referring to FIGS. 6 and 7, it is possible to obtain transmittance similar to a conventional FFS mode LCD by controlling phase retardation (Δn·d) of liquid crystal molecules.

As described above, a FFS mode LCD of the present invention has advantages of eliminating electrostatic and afterimages effectively by disposing an ITO layer on the inner surface of upper substrate, thereby realizing a high quality screen. And, the present invention simplifies the manufacturing process and reduces the production cost by omitting an over coating layer.

Although the preferred embodiment of this invention has been disclosed for illustrative purpose, those skilled in the art will appreciate that various modifications, additions and substitutions are possible, without departing from the scope and spirit of the invention.

What is claimed is:

1. A fringe field switching mode liquid crystal display comprising:
    a lower substrate and an upper substrate disposed opposite to each other at a predetermined distance, each said substrate having transparency;
    a counter electrode and a pixel electrode disposed on the inner surface of the lower substrate with a gate insulating layer interposed and made of transparent conductors, forming a fringe field when an electric field is applied;
    a black matrix and color filter formed on the inner surface of the upper substrate;
    an ITO layer disposed on the inner surface of the upper substrate directly adjacent the black matrix and color filter;
    a first horizontal alignment layer disposed on the ITO layer of the upper substrate; and
    a liquid crystal layer interposed between the lower and upper substrates, including a plurality of liquid crystal molecules having negative dielectric anisotropy.

2. The fringe field switching mode liquid crystal display according to claim 1, further comprising:
    a second horizontal alignment layer being disposed on the top of the lower substrate, having a predetermined rubbing axis, in an anti-parallel direction with that of the first horizontal alignment layer;
    a lower polarizing plate disposed on the outer surface of the lower substrate, having a polarizing axis in parallel with the rubbing axis of the first horizontal alignment layer; and
    an upper polarizing plate disposed on the outer surface of the upper substrate, having a polarizing axis perpendicular to that of the lower polarizing plate.

3. The fringe field switching mode liquid crystal display according to claim 1, wherein the counter electrode has a plate shape and the pixel electrode has a slit shape.

4. The fringe field switching mode liquid crystal display according to claim 1, wherein the counter electrode has one or more grooves.

5. The fringe field switching mode liquid crystal display according to claim 4, wherein the groove is disposed under the pixel electrode.

6. The fringe field switching mode liquid crystal display according to claim 4, wherein the width of the groove is smaller than that of slit of the pixel electrode.

7. The fringe field switching mode liquid crystal display according to claim 6, wherein the width of the groove is 2 or 3 μm.

8. The fringe field switching mode liquid crystal display according to claim 1, wherein the ITO layer includes a window region.

9. The fringe field switching mode liquid crystal display according to claim 1, wherein the liquid crystal molecules has a phase retardation of 0.20 to 0.50 μm.

* * * * *